Oct. 15, 1957     R. P. MOYER     2,809,531
TILT MECHANISM FOR VENETIAN BLINDS
Filed Sept. 12, 1955     2 Sheets-Sheet 2
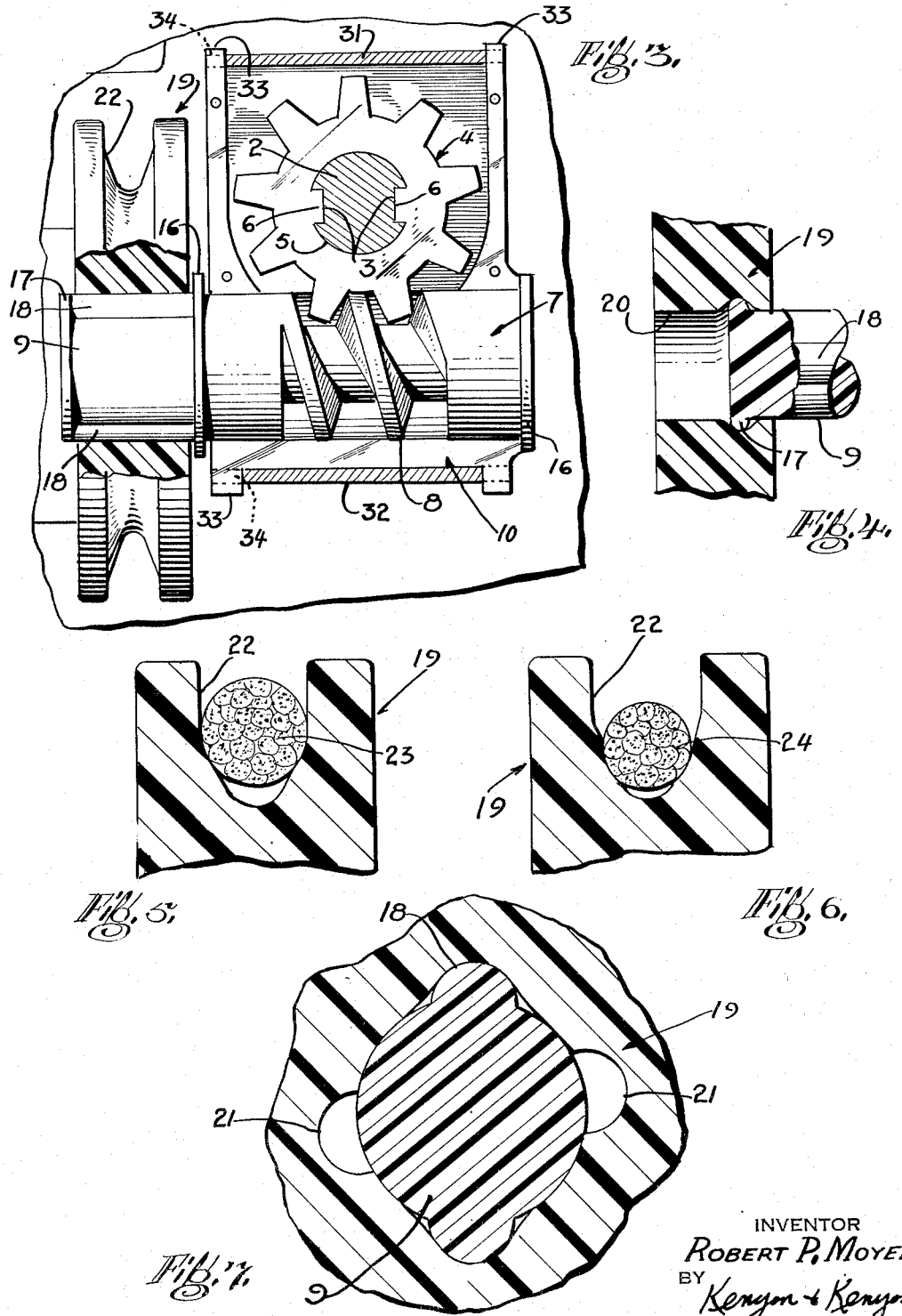
INVENTOR
ROBERT P. MOYER
BY
Kenyon & Kenyon
ATTORNEYS

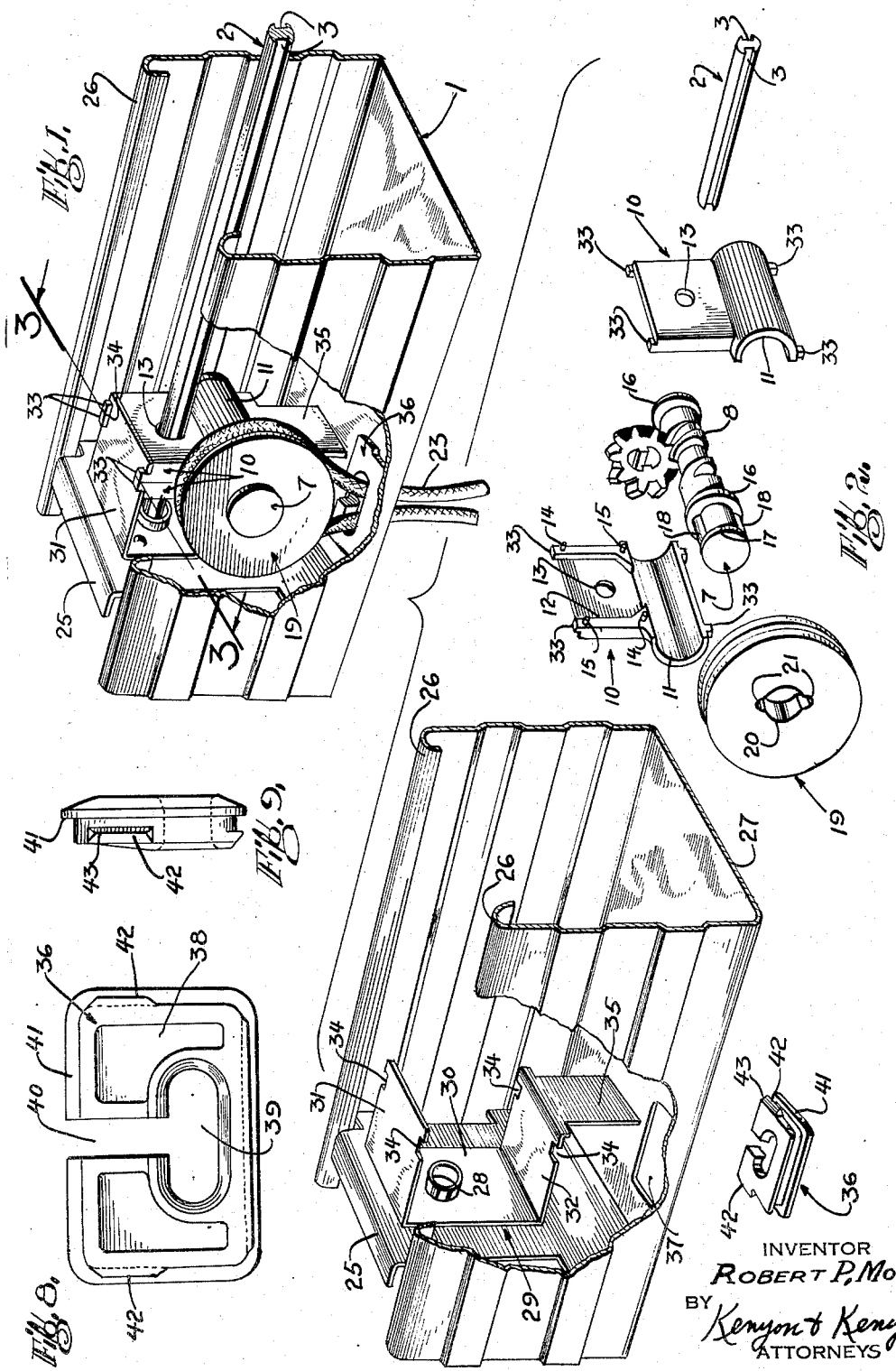

United States Patent Office 2,809,531
Patented Oct. 15, 1957

2,809,531

TILT MECHANISM FOR VENETIAN BLINDS

Robert P. Moyer, Sturgis, Mich., assignor to Kirsch Company, Sturgis, Mich., a corporation of Michigan Application September 12, 1955, Serial No. 533,770

4 Claims. (Cl. 74—222)

This invention relates to Venetian blinds and particularly to the tilt mechanism which is employed for tilting a system of Venetian blind slats.

Heretofore, in the manufacture of Venetian blinds the tilting or rotation of the slat system has been achieved by means of a worm and gear principle which lends itself admirably for the purpose and in which the rotation of the worm and gear has been accomplished by applying tension to a pendant cord which is looped over a rotatable sheave or pulley which is operatively connected to the worm. Heretofore, the obtaining of good gripping or driving force transfer from the cord to the sheave or pulley which drives the worm gear, has been a source of considerable inconvenience due in part to inherent difficulties in obtaining a good gripping or driving force transfer from the cord to the sheave commonly used and in part to the fact that manufacturers of blinds in the interest of economy, practically all use the same filled, braided cotton cord for tilt operation as is used by them elsewhere for raising and lowering the slat system. This cord is not especially adapted or suited to serve both purposes equally well.

Heretofore, most manufacturers have used a metallic tilt sheave or pulley usually made of two stamped metallic halves, mated and mounted on the metallic worm shaft to form an approximation of a V-pulley. Since the frictional relationship of the filled cotton cord and the smooth metallic surface is very poor, and since sharp or raised edges or surfaces of the metal would quickly wear the softer cord, the customary practice has been to produce staggered radially extended embossment in the flanges of the pulley. These tend to cramp the cord into a sinuous pathway in its partial wrap around the pulley and tend to provide some gripping action to the cord sufficient to operate the worm. However, even with such an arrangement there is a tendency for the cord to slip and this ultimately accumulates until one or the other of the ends creep out of reach of the operator.

Various efforts have been made to overcome this weakness and inconvenience in such tilting mechanism. Disengaging clutch mechanisms have been tried but they are excessively expensive. Quadrant gears have been employed in the worm system, permitting the adjustment of the cord ends by turning the system until disengagement of the gears. Efforts have been made to solve the problem by using a winding drum on the worm shaft with the cord affixed so as to wind on and off on the drum under rotation. This system, however, gives considerable trouble because the cord becomes entangled if the wraps become deranged.

One of the objects of this invention is to provide a tilt mechanism which overcomes the above mentioned difficulties.

Another object of the invention is to provide such a tilt mechanism which is simple and effective in operation and which can be manufactured and assembled inexpensively from especially well adapted materials.

Another object of the invention is to provide such a tilt mechanism which can be easily assembled or disassembled without the use of special tools or fixtures.

Another object of the invention is to provide such a tilt mechanism in which the pulley is formed of resilient, synthetic rubber-like material such as neoprene, having an annular V-shaped groove molded in its periphery to afford a pinching, tenacious cord gripping action with excellent efficiency with a high coefficient of friction to assist in preventing cord slippage, so as to accommodate cords of various sizes without sacrificing good cord gripping action and to retain cord gripping action even though the cord itself becomes worn or changes in dimension due to use or loses its sizing and tends to fluff up.

Another object of the invention is to provide such a tilt mechanism with a simple, effective over-running slip-clutch action which will permit easy adjustment of the tilt cord ends should any eventual cord grippage on the pulley require such adjustment of the tilt cord with relation to the slat system.

Another object of the invention is to provide such a tilt mechanism in which the adjustment can be performed in either direction when the tilt mechanism has been moved to either of its limiting positions.

Other objects of the invention will be apparent from the following description thereof.

For the purpose of illustrating the invention there is shown in the accompanying drawings a form thereof which is at present preferred since it gives desirable and satisfactory results. It will be understood, however, that the invention is not limited to the specific arrangement and organization shown and described, which is merely illustrative of the invention.

In the drawings:

Fig. 1 is a perspective view of an end of a Venetian blind mechanism with portions of the head member cut away to show the tilting mechanism mounted in place in the head member;

Fig. 2 is a view showing the parts of the invention disassembled and separated to show their relationship to one another;

Fig. 3 is a detailed sectional view taken on the line 3—3 of Fig. 1;

Fig. 4 is a partial sectional view showing the assembly of the cord pulley on the worm shaft;

Fig. 5 is a partial sectional view through the cord pulley showing how it accommodates cord of one size;

Fig. 6 is a similar view showing the pulley accommodating cord of a different size while retaining the desired frictional gripping relation;

Fig. 7 is a partial sectional view showing the cord pulley and worm shaft during adjustment to conform the cord to the position of the slat system;

Fig. 8 is a top plan view of the cord guide; and

Fig. 9 is an edge view taken from the right of Fig. 8 of the cord guide.

The invention is shown assembled in a Venetian blind of the type employing a channelled steel head member. The head member is illustrated at 1 and the tilt rod which extends longitudinally of and is concealed in the head member is shown at 2. This rod is provided with keyways 3 to non-rotatably engage both the worm gear to be described later and the tilting members to which the ladder tapes of the blind are fastened and which are not shown because they may be of any well known form for such tilting members and form no part of this invention.

The tilting mechanism consists of a worm gear which is provided with a central aperture 5 to slidably receive the shaft 2 to permit assembly of the worm on the shaft and the positioning thereof at any desired point. Within the central aperture 5 are keys 6 which engage in the keyways 3 on shaft 2 to provide driving connection between the worm 4 and the shaft 2 for tilting the slat system. The worm gear 4 is preferably formed of injection molded plastic such as nylon, since this provides the desired touch wearing surface and accuracy for mating with a cooperating worm.

For driving the worm gear there is provided an integral member or shaft 7 consisting of a worm 8 and a worm shaft extension 9. This member is likewise preferably formed of injection molded plastic, such as nylon.

The worm gear 4 and worm 8 are housed and retained in driving engagement by a housing consisting of a pair of opposed members 10, each of which is provided with a half round or half cylindrical groove 11, which serves to form, in cooperation with the opposed groove 11 on the opposed member, a suitable bearing and mount for the worm 8. Directly adjacent and above the groove 11 each of the members 10 is provided with a recess 12 in which the worm gear 4 is housed when the parts are assembled.

Each of the members 10 is provided with an aperture 13 through which the tilt shaft 2 extends to engage the worm gear 4, extending through the aperture 5 therein.

The housing members 10 are identical in form. Each has on it pins 14 and holes 15 to facilitate alignment and assembly of the housing members and to assist in holding them together in assembled position. The pins 14 on one member fit into the holes 15 on the other member, giving accurate alignment and positioning of the parts to provide alignment of the grooves 11 to form a cylindrical bearing surface for the worm 8.

The member 7 is provided with flanges 16 which are located at the extremities of the worm to position the worm and retain it in place in the bearing formed by the grooves 11 in the housing members 10 and to serve as thrust-bearing members when the worm 8 is rotated to drive the worm gear.

The members 10 are preferably formed of injection molded plastic such as nylon. When they are formed of this material they provide smooth, tough wearing and bearing surfaces which are extremely accurate and they are long lasting in use.

The projection or worm shaft 9 is provided at its outer extremity with a flange 17 which serves to position and hold the worm operating pulley in position against axial movement along the shaft. It is also provided with splines or keys 18 to resist rotational movement of the pulley on the shaft 9.

The cord pulley is shown at 19. It is provided with a central bore 20 and keyways or grooves 21. The bore 20 is of a size to fit over the worm shaft 9 and the keyways 21 are of a size and position to receive the keys or splines 18 on the shaft 9.

The pulley 19 is preferably formed of synthetic rubber or a synthetic rubber-like substance such as neoprene which is resilient and deformable and which presents a surface having a high coefficient of friction to the cord which is trained around it.

At the periphery the pulley is provided with a groove 22 which is sufficiently wide at the periphery of the pulley to freely receive cord of a maximum useable size but which tapers inwardly to a contour having a width smaller than any minimum size cord which might be employed for the tilting of the blind thus giving a contour similar to that of a V-belt pulley.

As shown in Fig. 5, where a relatively large cord 23, is illustrated, the resilient pulley contacts the cord and tends to grip it to give a good, firm grip to transfer the driving force of the cord when it is manipulated to tilt the slat system of the blind.

By conforming the pulley groove as above described, it will likewise adequately grip and hold a smaller cord 24 as illustrated in Fig. 6.

This is of particular value in both manufacture and servicing of the blind, as well as in use, because it permits the manufacturer to utilize cords of different diameter and it permits replacement of the original cord with a smaller cord or larger cord, should the serviceman not have cord of the exact diameter of that initially supplied with the blind. Furthermore, it allows for stretching of the cord with attendant diminishing of diameter without interfering with the frictional driving contact and gripping of the cord and likewise compensates for changes in the surface of the cord due to loss of sizing, fluffing up or the like. The cord is less subject to injury than with conventional pulleys and will generally last longer.

Since the pulley is formed of resilient synthetic rubber or rubber-like material such as neoprene, the pulley may be assembled on the worm shaft 9 by simply forcing it to position. The outer flange 17 will merely deform the material of the pulley as indicated in Fig. 4 and the pulley may be pushed to position where it will be retained by the flange 17 and the adjacent flange 16 and will be thus held against axial movement. The keys on the shaft engage in the keyways of the pulley to assist in the transfer of rotational mount of the pulley to the worm.

By utilizing the resilient material above described in forming the pulley, it is possible to make adjustments of the tilt cord ends to conform to the position of the slats in the slat system should any creeping of the cord occur, by simply turning the tilting mechanism to its end or limiting position and continuing to pull on the cord. The resilient material of the pulley will then give as is shown in Fig. 7 and the pulley will move past the splines until the pulley has been rotated sufficiently to adjust the ends of the cord to conform with the position of the slats.

During this rotation of the pulley, the flanges 16 and 17 adjacent the pulley will retain it in axial position on the worm shaft 9.

The material of the pulley has a coefficient of friction greater than that of metal so as to provide greater frictional driving connection between the cord and the pulley than is the case in the prior art metal pulley constructions. The resiliency of the pulley will help to grip the cord which is forced down into the tapering groove when force is applied to the ends of the cord.

The material of the pulley gives satisfactory results if it has a Durometer hardness of 55. A softer material will give satisfactory results and a hardness as great as 71, will prove satisfactory. With reduction in the hardness of the rubber, the anchorage of the pulley against rotation under the normal forces involved in rotating the blinds may be desired and can be obtained either by raising the height of the splines or keys 18 or by increasing their number.

The worm gear and worm housing is supported by a support 25 comprising a plate adapted to be disposed transversely of the head member 1 and frictionally retained in place between the sides of the head member 1 and the roll-over edges 26 and the bottom 27. This plate is centrally apertured at 28 where it carries a bearing for the shaft 2.

A mounting bracket 29 formed of a flat metal strip approximately .032" thick is secured to the supporting member or plate 25. It consists of a central base member 30 which abuts against the plate 25 and portions 31 and 32 bent at right angles thereto and projecting therefrom and from said plate 25 to form opposed retaining members for the housing members 10 adapted to embrace the housing members and retain them in assembled position. These members 31 and 32 are resiliently movable toward or away from one another so that the assembled housing members with the gear and worm contained therein can be snapped into position between the members 31 and 32 as is shown in Figs. 1 and 3.

Each of the housing members 10 is provided with a pair of lugs 33 which are opposed to one another when the housing members 10 are assembled and each of the members 31 and 32 is provided with a pair of lateral openings or notches 34, each of which is adapted to receive the lugs 33 of the assembled housing to assist in holding the members 10 in assembled position.

An extension 35 extends laterally from the member 32 and downwardly to engage the bottom 27 of the housing or head member 1 to offer support for the tilting unit.

It will be apparent that the supporting member 25 with the attached member 29, can be slid into position in the head member without the use of tools and it will be retained frictionally in position. It can be used either left or righthanded. It will also be apparent that the assembled housing member 10 and the gear 4 and the worm 8 assembled as a unit can be snapped between the members 31 and 32 without the use of tools and that these members will thus be retained in assembled position without any additional fastening means. It will also be apparent that when the unit is used righthanded, the housing unit will be inserted in one position while it will be reversed if the supporting member 25 is reversed for use at the other end of the blind.

The blind is provided with a cord guide made of molded plastic such as nylon. This guide is indicated at 36 and is adapted to fit in the aperture 37 in the bottom head member 1 and to embrace the cord 23 as is shown in Fig. 1. The cord guide consists of a plate 38 having a central opening 39 for the tilt cord and a slit 40 extending from said opening to one portion of the periphery of the plate, thus forming a resilient member which can be snapped into place. Extending from the periphery of the plate 38 is a flange 41 adapted to engage the bottom of the head member 1 on the lower side thereof. Flanges 42 project from the upper portion of the plate overlying the flange 41 to form a lateral groove adapted to receive the edges of the opening 37. These flanges extend only part way along the edges and one beveled as indicated at 43 so that when the cord guide is placed in the opening with the flanges opposite the slot 40 embracing one edge of the opening in the head member pressure tending to rotate the guide about the edge of the opening will bring the beveled portions 43 of the flanges into engagement with the lateral edges of the opening forcing the sides of the guide together resiliently to tend to close the slot 40 to permit the guide to snap to position in the opening where it will be held by the resiliency of the guide.

The guide being of moulded plastic such as nylon presents a highly desirable smooth surface for the cord which will not wear the cord and which will not discolor or otherwise deteriorate the cord and which will also present a neat appearance and will tend to hold the cord wrapped well around the tilt pulley to increase its contact with the cord and give increased driving connection between the resilient pulley and the cord.

The present invention may be embodied in other specific forms without departing from the spirit or essential attributes thereof. It is therefore desired that the present embodiment be considered in all respects as illustrative and not restrictive, reference being had to the appended claims rather than to the foregoing description to indicate the scope of the invention.

I claim:

1. In a Venetian blind, a tilting unit having a worm gear and a worm shaft having thereon a worm engaging said worm gear and a keyed portion extending from said worm and having a key formed thereon, a pulley of deformable elastic material having a coefficient of friction in excess of that of metal and having a groove of tapered cross-section at its periphery to frictionally receive a tilt cord trained therearound and having a central bore adapted to fit said keyed portion of said worm shaft and having a keyway adapted to fit said key on said keyed portion of said worm shaft whereby rotation of said pulley may drive said worm shaft and whereby through yielding of the material of said pulley rotational adjustment of said pulley on said shaft may be effected without removal when the tilt mechanism is at an end of its movement.

2. In a Venetian blind tilting mechanism, a worm gear and a worm shaft having a worm engaging said worm gear and a keyed portion extending from said worm and having a key formed thereon, a pulley of deformable elastic material having a central bore adapted to fit said keyed portion of said worm shaft and having a keyway adapted to fit said key on said keyed portion of said worm shaft whereby rotation of said pulley may drive said worm shaft and whereby through yielding of the material of said pulley rotational adjustment of said pulley on said shaft may be effected without removal when the tilt mechanism is at an end of its movement.

3. In a Venetian blind tilting mechanism, a worm gear and a worm shaft having a worm engaging said worm gear and a keyed portion extending from said worm and having a key formed thereon, a pulley of deformable elastic material having a coefficient of friction in excess of that of metal and having a groove at its periphery to frictionally receive a tilt cord trained therearound and having a central bore adapted to fit said keyed portion of said worm shaft and having a keyway adapted to fit said key on said keyed portion of said worm shaft whereby rotation of said pulley may drive said worm shaft and whereby through yielding of the material of said pulley rotational adjustment of said pulley on said shaft may be effected without removal when the tilt mechanism is at an end of its movement.

4. In a Venetian blind tilting mechanism, a worm gear, a worm shaft having a worm engaging said worm gear and a pulley engaging and supporting portion extending from said worm, a pulley of deformable elastic material having a central bore adapted to fit said pulley engaging portion of said worm shaft, said worm shaft and pulley having formed thereon interfitting means adapted to provide a driving connection between said pulley and shaft whereby rotation of said pulley may drive said shaft and whereby through yielding of the material of said pulley rotational adjustment of said pulley on said shaft may be effected without removal when the tilt mechanism is at an end of its movement.

References Cited in the file of this patent

UNITED STATES PATENTS

| | | |
|---|---|---|
| 2,160,611 | Alexander | May 30, 1939 |
| 2,223,404 | Burns | Dec. 3, 1940 |
| 2,223,997 | Lorentzen | Dec. 3, 1940 |
| 2,416,197 | Moyer et al. | Feb. 18, 1947 |
| 2,498,079 | Hunter | Feb. 21, 1950 |
| 2,518,851 | Anderson | Aug. 15, 1950 |
| 2,608,876 | Miller | Sept. 2, 1952 |
| 2,663,895 | Petri | Dec. 29, 1953 |
| 2,722,130 | Caldwell | Nov. 1, 1955 |